(12) United States Patent
Gonzalez et al.

(10) Patent No.: US 7,078,557 B2
(45) Date of Patent: Jul. 18, 2006

(54) COMPOUND OF PLASTICIZERS FOR THE WATER DISPERSABILITY OF RESINS

(75) Inventors: Victor Duran Gonzalez, Barcelona (ES); Paolo Ara, Barcelona (ES)

(73) Assignee: Condensia Quimica S.A., Barcelona (ES)

(*) Notice: Subject to any disclaimer, the term of this patent is extended or adjusted under 35 U.S.C. 154(b) by 364 days.

(21) Appl. No.: 10/274,887

(22) Filed: Oct. 22, 2002

(65) Prior Publication Data

US 2004/0063834 A1 Apr. 1, 2004

(30) Foreign Application Priority Data

Sep. 27, 2002 (ES) .............................. P 200202191

(51) Int. Cl.
*C07C 69/017* (2006.01)

(52) U.S. Cl. ..................................... 560/112

(58) Field of Classification Search ................ 560/112
See application file for complete search history.

(56) References Cited

U.S. PATENT DOCUMENTS

| | | |
|---|---|---|
| 2,070,331 A | 2/1936 | Derby |
| 2,585,448 A | 11/1948 | Emerson et al. |
| 2,956,978 A | 10/1960 | Reeves, Jr. et al. |
| 3,874,985 A | 4/1975 | Karass |
| 4,277,387 A | 7/1981 | Jordan, Jr. et al. |
| 4,331,579 A | 5/1982 | Haemer |
| 4,336,166 A | 6/1982 | Penczuk et al. |
| 4,444,933 A | 4/1984 | Columbus et al. |
| 4,767,813 A | 8/1988 | Evitt |
| 4,818,779 A | 4/1989 | Witucki et al. |
| 5,676,742 A | 10/1997 | Arendt et al. |

FOREIGN PATENT DOCUMENTS

| | | |
|---|---|---|
| EP | 157426 | 5/1984 |
| EP | 234710 | 2/1987 |
| GB | 496574 | 6/1936 |
| GB | 815991 | 2/1956 |
| GB | 1321383 | 5/1971 |
| JP | 81-00-304 | 4/1996 |

OTHER PUBLICATIONS

A.V. Bailey et al., J.Am.Oil.Chem.Soc 1976, 53(5), 176-178.
W.D. Arendt (Velsicol Chemical Corporation), Tech.Pap. 1979, 25, 410-412.
Fed.Regist. 1987 52(4) 527-530 (copy not located).

*Primary Examiner*—Elvis O. Price
(74) *Attorney, Agent, or Firm*—Pravel Intellectual Property Law, P.C.; James W. Pravel

(57) ABSTRACT

A compound of plasticizers for the water dispersability of diol diarylate-type resins is disclosed; wherein the compound contains a high amount of diol monocarylates and optionally contains triol mono- or diarylates.

14 Claims, 1 Drawing Sheet

COMPOUND OF PLASTICIZERS FOR THE WATER DISPERSABILITY OF RESINS

PURPOSE OF THE INVENTION

Compound of plasticizers based on a compound of diol or triol monoesters and diesters with benzoic acid and with a methylbenzoic acid, for use as an additive for adhesives applied in hydrophylous mediums.

BACKGROUND TO THE INVENTION

The use of dipropylenglycol or diethylenglycol ditolutes or dibenzotes and their compounds, and their use as plasticizers is documented in technical literature since the last century. For example, the following publications describe the use as a plasticizer of diethylenglycol dibenzoate (DDB), triethylenglycol dibenzoate (TDB), diethylenglycol ditoluate (DDT), and triethylenglycol ditoluate (TDT) or their compounds: U.S. Pat. No. 2,070,331 (1936); UK 496,574 (1936); U.S. Pat. No. 2,585,448 (1948); UK 815,991 (1956); U.S. Pat. No. 2,956,978 (1960); UK 1,321,383 (1971); U.S. Pat. No. 3,874,985 (1973); Jpn Tokkyo Koho 81 00,304 (1975); A. V. Bailey et al., J. Am. Oil. Chem. Soc 1976, 53(5), 176–178; W. D. Arendt (Velsicol Chemical Corporation), Tech. Pap. 1979, 25, 410–412; U.S. Pat. Nos. 4,277, 387 1981; 4,331,579 (1982); 4,336,166 (1982); 4,444,933 (1982); EPO 0 157 426 (1984); EPO 0 234 710 (1987); Fed. Regist. 1987 52(4) 527–530; U.S. Pat. Nos. 4,767,813 (1988); 4,818,779 (1989).

The plasticizer mentioned in a number of the above documents, since at least as early as 1982, is Benzoflex, trademark of Velsicol Chemical Corporation to denominate a range of plasticizers with a composition of DDB and TDB compounds. There are other trademarks using the same range of compounds or equivalents of the same polyglycol polyesters, such as K-Flex, owned by Furam Chemicals Ltd. The use as plasticizers of arylic diesters of other glycols, such as propylenglycol derivatives, is also described in literature.

There are two chemico-physical reasons:
1. a good plasticizer must be liquid at room temperature,
2. the polymer to be plasticized (such as vinyl or acrylic-type polymers) is water-repellent that recommend that the plasticizer should be a compound of arylic glycol diesters and, sometimes, triol triesters. In a document such as U.S. Pat. No. 5,676,742, when a compound with diethylenglycol and dipropylenglycol monoesters, together with the corresponding diesters, is described, it is to highlight that the advantage is not as a plasticizer, but as an additive resistant to the growth of mildew.

The fact that the most popular plasticizers in industry are liquid diesters is because:
1. Processes in which a plasticizer is involved, are conducted in totally water-repellent mediums, such as poly(vinyl chloride) or poly(methyl acrylate). The nature of these water-repellent mediums means that the presence of monoesters deteriorates the technical properties of the plasticizer (for example, see U.S. Pat. No. 2,956,978).
2. The required flexibility in the final plastic is reduced if the plasticizers become solid at room temperature. A liquid compound of plasticizers in which at least one of its components of over 20% becomes solid at room temperature, has disadvantages in certain cases, such as when it is used with adhesives to join parts in motion.

The highly water-repellent nature of the polymers to be plasticized means that the dispersability in water of these polymers is very short. This is demonstrated in recent generally vinyl or acrylic polymer-based industrial adhesives applied in aqueous mediums, as during industrial use of usual plasticized polymer formulae with DDB or TDB compounds, an aqueous phase and another water-repellent phase are quickly separated, rapidly causing a lack of homogeneity in these suspensions. This results in a faulty application of the adhesive leading to less adhesive power.

SUMMARY OF THE INVENTION

The purpose of this invention is to eliminate the inconveniece of the seperation of phases during the industrial application of coats or seals in a water or a simple hydrophylous medium, by using a compound of plasticizers for the water dispersibility of resins.

The invention is comprised of a compound of diol or triol arylic monoesters, as the vehicle plasticizer of hydrophylous properties, together with the aforementioned arylic diesters that are water-repellent but easily miscible with the monoester molecules. It has been discovered that the monoesters of these polyoles are excellent molecules to intervene sufficiently in the solvation/dispersion in water of the polymer water-repellent molecules.

The high polarity of the plasticizer compound of the invention enables dispersions with eight-hour stability to be achieved. This time period is a significant improvement in the industrial handling of dispersions.

Part of the invention includes the option of having a slight percentage of an arylic ester of a triol, such as 1,1,1,-trimethylolpropane, present in the plasticizer compound. This component also increases the average molecular weight of the plasticizer compound, resulting in a favorable reduction of volatility and migration.

DESCRIPTION OF A PREFERRED EMBODIMENT OF THE INVENTION

Figure 1:
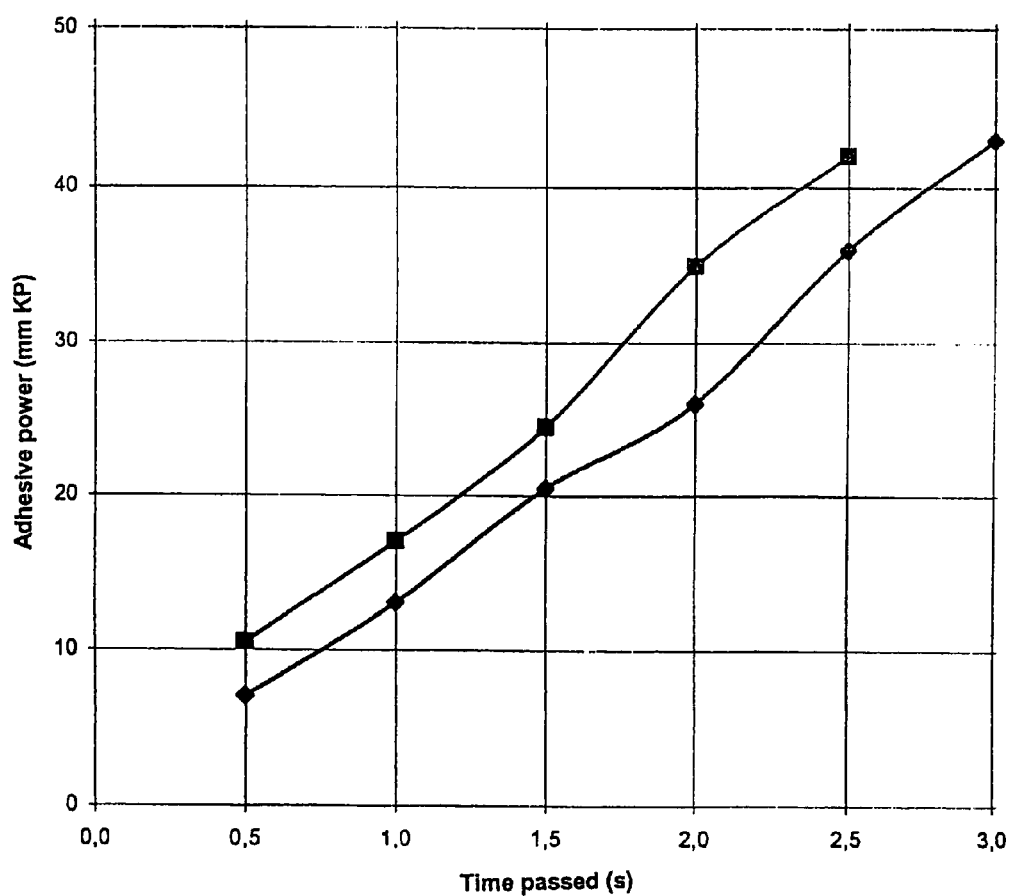
FIG. 1 is a graph that shows the adhesive strength of the inventive adhesive relative to the adhesive strength of conventional adhesive.

| DESCRIPTION OF THE PLASTICIZER COMPONENTS WHICH ARE THE PURPOSE OF THE INVENTION ||
|---|---|
| Group 1. Glycol monoarylates. | Ar-COO-$R_2$-OH |
| Group 2. Glycol diarylates. | Ar-COO-$R_2$-OCO-AR |
| Group 3. Triol monoarylates. | Ar-COO-(R3)(OH)$_2$ |
| Group 4. Triol diarylates. | (Ar-COO)$_2$-(R3)-OH | where Ar—COO— represents any of the following functional groups: Benzoate, 1-methylbenzoate, 2-methylbenzoate and 3-methylbenzoate.

Glycols can be: Diethylenglycol, triethylenglycol, dipropylenglycol, tripropylenglycol, neopenthylglycol.

Triols can be: Glycerin, 1,1,1-trimethylolethane, 1,1,1,-trimethylolpropane, 1,2,6-hexanotriol.

DESCRIPTION OF A PREFERRED METHOD OF MANUFACTURING THE INVENTION

Monoesters, diesters and their compounds are prepared following any of the existing methods, such as by mixing the pure chemicals or by joint sterification of the polyalcohols. Proportions in compounds are expressed in weight %.

Formula 1.
Diethylenglycol monobenzoate . . . 10%
Diethylenglycol monotoluate . . . 2%
Dipropylenglycol monobenzoate . . . 10%
Dipropylenglycol monotoluate . . . 1%
1,1,1-trimethylolethane monobenzoate . . . 3%
Diethylenglycol dibenzoate . . . 35%
Diethylenglycol ditoluate . . . 1%
Dipropylenglycol dibenzoate . . . 35%
Dipropylenglycol ditoluate . . . 2%
1,1,1-trimethyloletane dibenzoate . . . 1%
Formula 2.
Diethylenglycol monobenzoate . . . 10%
Diethylenglycol dibenzoate . . . 40%
Dipropylenglycol monobenzoate . . . 5%
Dipropylenglycol dibenzoate . . . 20%
Triethylenglycol monobenzoate . . . 5%
Triethylenglycol dibenzoate . . . 20%
Formula 3.
Diethylenglycol monobenzoate . . . 10%
Diethylenglycol dibenzoate . . . 50%
Dipropylenglycol monobenzoate . . . 10%
Dipropylenglycol dibenzoate . . . 30%
Formula 4.
Diethylenglycol monobenzoate . . . 10%
Diethylenglycol dibenzoate . . . 38%
Dipropylenglycol monobenzoate . . . 5%
Dipropylenglycol dibenzoate . . . 20%
Triethylenglycol monobenzoate . . . 5%
Triethylenglycol dibenzoate . . . 20%
1,1,1-trimethylolethane monobenzoate . . . 1.5%
1,1,1-trimethylolethane dibenzoate . . . 0.5%

A typical result of those obtained with the new plasticizers is indicated in the graph in FIG. 1.

The upper line of the graph in FIG. 1 shows, according to the seconds elapsed since the application of the adhesive, the adhesive power reached by one of the marketed water adhesives when the formula 2 plasticizer is used.

The bottom of the graph in FIG. 1 shows the adhesive power reached by the same water adhesive under the same conditions, when the plasticizer is one of those currently used for this type of adhesive.

The improved adhesive power is because of the greater dispersability of the plasticizer in water caused by the presence of hydrophylous hydroxyl groups.

The invention claimed is:

1. Compound of plasticizers for the water dispersability of diol diarylate-type resins, wherein said compound contains a quantity of diol monoarylates and triol monoarylates.

2. Compound of plasticizers in accordance with claim 1, wherein said diol and triol monoarylates are monoester derivatives of one or several of the following: Benzoic acid, 1-methylbenzoic acid, 2-methylbenzoic acid, or 3-methylbenzoic acid.

3. Compound of plasticizers in accordance with claim 1, including the simultaneous presence of at least two diesters and two monoesters.

4. Compound of plasticizers in accordance with claim 1, wherein the weight proportion of the total diol monoarylates is between 5% and 35% of the total final compound.

5. Compound of plasticizers in accordance with claim 1, wherein the weight proportion of said diol diarylate-type resins is between 50% and 80% of the total final compound.

6. Plasticizers in accordance with claim 1, wherein the weight proportion of the total triol monoarylates is typically greater than 0% and not more than 10% of the final compound.

7. Plasticizers in accordance with claim 1, wherein the hydroxyl index, determined according to standard ASTM E 222 (94), is between 35 and 70.

8. Compound of plasticizers for the water dispersability of diol diarylate-type resins, wherein said compound contains a quantity of diol monoarylates and triol diarylates.

9. Plasticizers in accordance with claim 8, wherein the hydroxyl index, determined according to standard ASTM E 222 (94), is between 35 and 70.

10. Plasticizers in accordance with claim 8, wherein the weight proportion of the triol diarylates is typically greater than 0% and not more than 5% of the total final compound.

11. Compound of plasticizers in accordance with claim 8, wherein said monoarylates are monoester derivatives of one or several of the following: Benzoic acid, 1-methylbenzoic acid, 2-methylbenzoic acid, or 3-methylbenzoic acid.

12. Compound of plasticizers in accordance with claim 8, including the simultaneous presence of at least two diesters and two monoesters.

13. Compound of plasticizers in accordance with claim 8, wherein the weight proportion of the total diol monoarylates is between 5% and 35% of the total final compound.

14. Compound of plasticizers in accordance with claim 8, wherein the weight proportion of said diol diarylate-type resins is between 50% and 80% of the total final compound.

* * * * *